Feb. 1, 1927.
W. F. RIDGE
WINDSHIELD CLEANER
Filed April 24, 1926
1,615,915
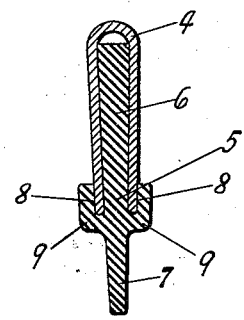
FIG.-2.
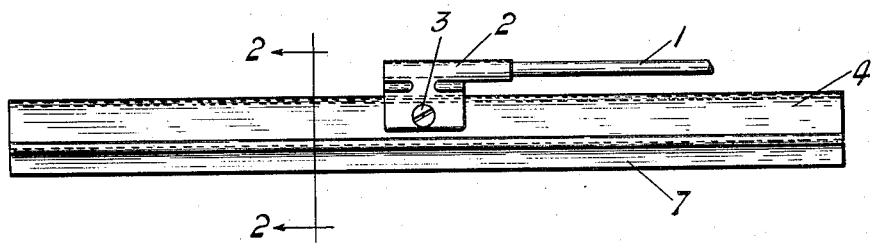
FIG.-1.
INVENTOR.
WILLIAM F. RIDGE.
BY 
ATTORNEY.

Patented Feb. 1, 1927.

1,615,915

UNITED STATES PATENT OFFICE.

WILLIAM F. RIDGE, OF AKRON, OHIO.

WINDSHIELD CLEANER.

Application filed April 24, 1926. Serial No. 104,353.

This invention relates to windshield cleaners such as used on automobiles at the present time, the object of the invention being to improve upon these devices in certain respects.

The windshield cleaners in use at the present time comprise a thin web or strip of rubber which is clamped in a bent metal holder, the holder being fastened on the end of the operating arm. The objection to this type of cleaner is that the rubber will split or wear away exposing the edges of the metal, and the light rubber web will bend over to such an extent that the metal will be forced against the glass by pressure upon the operating arm. In either event the edges of the holder will scratch the glass and mar it.

It is the object of the present invention to design a form of rubber wiper which will be strengthened at the edges of the metal holder so that splitting of the rubber will be prevented, and in which the edges of the holder are covered and protected in such a way that they will never come in contact with the glass either through the splitting of the rubber or through bending over of the web which is in contact with the glass. The invention is shown in one form only, it being understood that specific embodiments of the invention may be made differing in detail therefrom, but within the scope of the claims.

Of the accompanying drawings:

Figure 1 is a side view of the improved cleaner of the present invention; and

Figure 2 is a section on the line 2—2 of Figure 1.

In the drawings, 1 represents the operating arm for the windshield cleaner. At the end of the arm is secured the clip 2 which embraces and is fastened by a screw 3 to the metal holder 4. The metal holder is in the form of a long U-shaped clamp in the open end of which is received the rubber wiper 5.

This wiper is formed with an enlarged clamping portion 6 which is received within the U-shaped holder and a thin flexible web 7 which bears against the glass. At the line where the wiper enters the clamp or holder, the rubber is enlarged to provide two longitudinal channels 8 in which the edges of the holder are received, the shoulders 9 formed thereby overlying the edges of the holder and reinforcing it at this point. They also serve to protect the edge of the holder from contact with the glass. The enlargement along the inner edge of the wiper serves to prevent the removal of the wiper from the holder.

The invention is useful in all kinds of wipers and is not necessarily confined to the pivoted windshield wiper which has been described and shown.

What is claimed is:

1. A wiper comprising a holder which is bent longitudinally to provide a channel, and a rubber strip secured within the channel, the strip having a comparatively thin flexible web projecting outwardly of the holder in the plane thereof and having outwardly swelling shoulders lying over the edges of the holder.

2. A wiper comprising a holder which is bent longitudinally to provide a channel, and a rubber strip secured within the channel, the strip having a comparatively thin flexible web projecting outwardly of the holder in the plane thereof and having outwardly swelling shoulders lying over the edges of the holder and channels in which the edges of the holder are received.

WILLIAM F. RIDGE.